US012693690B2

(12) United States Patent
Leutwyler et al.

(10) Patent No.: US 12,693,690 B2
(45) Date of Patent: Jul. 28, 2026

(54) PASSIVE MODULATING DESIGN FOR FAST RESPONDING CONTROL VALVES FOR HIGH PRESSURE GAS APPLICATIONS

(71) Applicant: KALSI ENGINEERING, INC., Sugar Land, TX (US)

(72) Inventors: Zachary Wade Leutwyler, Richmond, TX (US); Emil Mack Leutwyler, Richmond, TX (US); Mital Chandrakant Mistry, Richmond, TX (US); Manmohan Singh Kalsi, Houston, TX (US)

(73) Assignee: KALSI ENGINEERING, INC., Sugar Land, TX (US)

( * ) Notice: Subject to any disclaimer, the term of this patent is extended or adjusted under 35 U.S.C. 154(b) by 35 days.

(21) Appl. No.: 18/645,092

(22) Filed: Apr. 24, 2024

(65) Prior Publication Data

US 2024/0353871 A1 Oct. 24, 2024

Related U.S. Application Data

(60) Provisional application No. 63/577,440, filed on Apr. 24, 2023.

(51) Int. Cl.
| | |
|---|---|
| *G05D 7/01* | (2006.01) |
| *F16K 17/30* | (2006.01) |
| *G05D 16/10* | (2006.01) |

(52) U.S. Cl.
CPC ......... *G05D 7/0126* (2013.01); *G05D 16/107* (2019.01); *F16K 17/30* (2013.01); *Y10T 137/7785* (2015.04)

(58) Field of Classification Search
CPC .... F16K 17/28; F16K 17/30; Y10T 137/7785; Y10T 137/7795; Y10T 137/7835; Y10T 137/7869
See application file for complete search history.

(56) References Cited

U.S. PATENT DOCUMENTS

| | | | | |
|---|---|---|---|---|
| 934,286 | A | * | 9/1909 | Cole ....................... F16K 17/30 222/525 |
| 1,477,244 | A | * | 12/1923 | Collins ................ G05D 7/0126 137/503 |

(Continued)

FOREIGN PATENT DOCUMENTS

| | | |
|---|---|---|
| CN | 102859204 A | 1/2013 |
| CN | 205244403 U | 5/2016 |
| KR | 101671085 B1 | 10/2016 |

OTHER PUBLICATIONS

International Search Report and Written Opinion for PCT Application No. PCT/US2024/026061 dated Aug. 8, 2024.

*Primary Examiner* — Robert K Arundale
(74) *Attorney, Agent, or Firm* — Douglas W. Rommelmann; Grable Martin PLLC

(57) ABSTRACT

A passive, modulating flow control valve including a poppet having a precisely designed and constant unbalanced area. A spring rate is selected to achieve the desired poppet travel over the desired range of differential pressure. Preferably, the spring preload is selected such that the poppet will remain fully open until a specified minimum differential pressure is reached. The unbalanced area and spring force allow the poppet to reposition proportional to the differential pressure throughout the design range of differential pressure. An array of radial holes in the poppet are used to define the trim characteristics. As the poppet is pushed closed by the differential pressure, few radial holes remain uncovered, which increases the flow resistance. The single modulating poppet includes flow and trim characteristics that respond directly to differential pressure acting on it to achieve tight control of the mass flow rate.

23 Claims, 8 Drawing Sheets

(56)                    References Cited

U.S. PATENT DOCUMENTS

| | | | | |
|---|---|---|---|---|
| 2,633,147 | A * | 3/1953 | Badami | ................. B60T 11/326 |
| | | | | 137/538 |
| 2,865,397 | A * | 12/1958 | Chenault | ................. F16K 17/30 |
| | | | | 251/282 |
| 3,741,241 | A * | 6/1973 | Jackson | .................. F16K 17/30 |
| | | | | 137/504 |
| 4,605,039 | A * | 8/1986 | Johnson | .................. F16K 17/30 |
| | | | | 137/460 |
| 4,809,740 | A * | 3/1989 | Nevlud | ................... F16K 17/24 |
| | | | | 137/460 |
| 5,514,110 | A * | 5/1996 | Teh | ................... A61M 5/16881 |
| | | | | 604/249 |
| 2006/0124174 | A1 * | 6/2006 | Flynn | ..................... F16K 17/30 |
| | | | | 137/509 |
| 2009/0211650 | A1 | 8/2009 | Jeon | |
| 2020/0088217 | A1 | 3/2020 | Zähe | |

* cited by examiner

PASSIVE MODULATING DESIGN FOR FAST RESPONDING CONTROL VALVES FOR HIGH PRESSURE GAS APPLICATIONS

CROSS-REFERENCE TO RELATED APPLICATIONS

This application claims the benefit of U.S. Provisional Application Ser. No. 63/577,440 filed on Apr. 24, 2023, by Zachary Leutwyler and Manmohan Kalsi, entitled "Passive Modulating Designs For Fast Responding Control Valves For High Pressure Gas Applications." Applicant incorporates by reference herein Application Ser. No. 63/577,440 in its entirety.

STATEMENT REGARDING FEDERALLY SPONSORED RESEARCH OR DEVELOPMENT

This invention was made with Government support under Contract No. DE-SC0023918, awarded by Office of Science, U.S. Department of Energy. The Government therefore has certain rights in this invention.

BACKGROUND OF THE INVENTION

1. Field of the Invention

The present invention relates generally to control valves for high pressure gas applications, and more particularly to passive, fast responding control valves for high pressure gas applications.

2. Description of the Related Art

In many high pressure gas applications, such as a hydrogen fueling system, the process environment of the hydrogen fueling station is dominated by a continuous state of highly transient conditions. Transient conditions include sharp changes in pressure caused by switching between supply tanks, rapid decrease in pressure (due to mass depletion and inherent cooling of hydrogen in the supply tank), and pressure increase in the vehicle fuel tank. Due to these ever-changing conditions, the plant and valve control loops are constantly chasing the target mass flow rate. Continuous and substantial valve position changes introduce secondary effects. Rapid changes in valve position cause changes in the mass flow, which induces additional pressure transients. Because of the highly transient state of the system and inherent consequence of using a fast-acting control system to control a single, fast-acting control valve, substantial and frequent deviations in mass flow rate are inevitable.

The hydrogen refueling system is composed of multiple high pressure supply tanks that are connected to a common header. The flow rate from the header is controlled via a flow control valve that is typically located in the dispenser. Supply from the supply tanks is sequenced to maintain timely transfer to the receiving tank. The sequence consists of staging the supply tanks so that only one supply tank (or set of tanks) is active at a time. When the pressure in the active supply tank decreases to a certain value, that tank is isolated and the next supply tank in the sequence becomes active. Switching to the next active supply tank suddenly increases the differential pressure acting across the flow control valve. The transient caused by switching between supply tanks results in frequent and substantial control valve cycling. If the control valve does not respond quickly, a substantial increase in mass flow rate occurs at the onset of tank switching.

Typically, switching from one active supply tank to the next supply tank occurs when the differential pressure between the active supply tank and the receiving tank reaches a predetermined minimum value. Currently, hydrogen refueling tanks are initially pressurized to 10,000 psi, although proposals exist to pressurize refueling tanks to even higher pressures.

It would be desirable to have a passive, modulating flow control valve adapted for service in high pressure gas applications, including hydrogen refueling systems and applications.

It would be desirable to have a passive, modulating flow control valve that responds rapidly to changing differential pressure that acts across the valve and further desirable to maintain as constant of a mass flow rate as possible.

SUMMARY OF THE INVENTION

One aspect of the present invention relates generally to a passive, modulating flow control valve. The preferred embodiment of the passive, modulating flow control valve can be used in place of the active control valve currently included in hydrogen fueling stations and other high pressure gas applications. The passive, modulating flow control valve is designed to operate in hydrogen fueling stations that recharge hydrogen tanks installed in hydrogen powered cars and trucks.

One aspect of the present invention of the passive, modulating flow control valve is a poppet that responds rapidly to changing differential pressure acting across the valve to maintain as constant a mass flow rate as possible.

The passive, modulating flow control valve according to a preferred embodiment including a poppet having a precisely designed and constant unbalanced area. A spring rate is selected to achieve the desired poppet travel over the desired range of differential pressure. Preferably, the spring preload is selected such that the poppet will remain fully open until a specified minimum differential pressure is reached. The unbalanced area and spring force allow the poppet to reposition proportional to the differential pressure throughout the design range of differential pressure. An array of radial holes in the poppet are used to define the trim characteristics. As the poppet is pushed closed by the differential pressure, few radial holes remain uncovered, which increases the flow resistance. The single modulating poppet is designed with a specific trim (or flow) characteristics that respond to differential pressure to achieve tight control of the mass flow rate through the combined effect of poppet position, trim characteristics and differential pressure.

BRIEF DESCRIPTION OF THE SEVERAL VIEWS OF THE DRAWINGS

The aspects, features, and advantages of the embodiments of the invention mentioned above are described in more detail by reference to the drawings, wherein like reference numerals represent like elements having the same basic function, in which.

DESCRIPTION OF THE PREFERRED EMBODIMENTS

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 1:
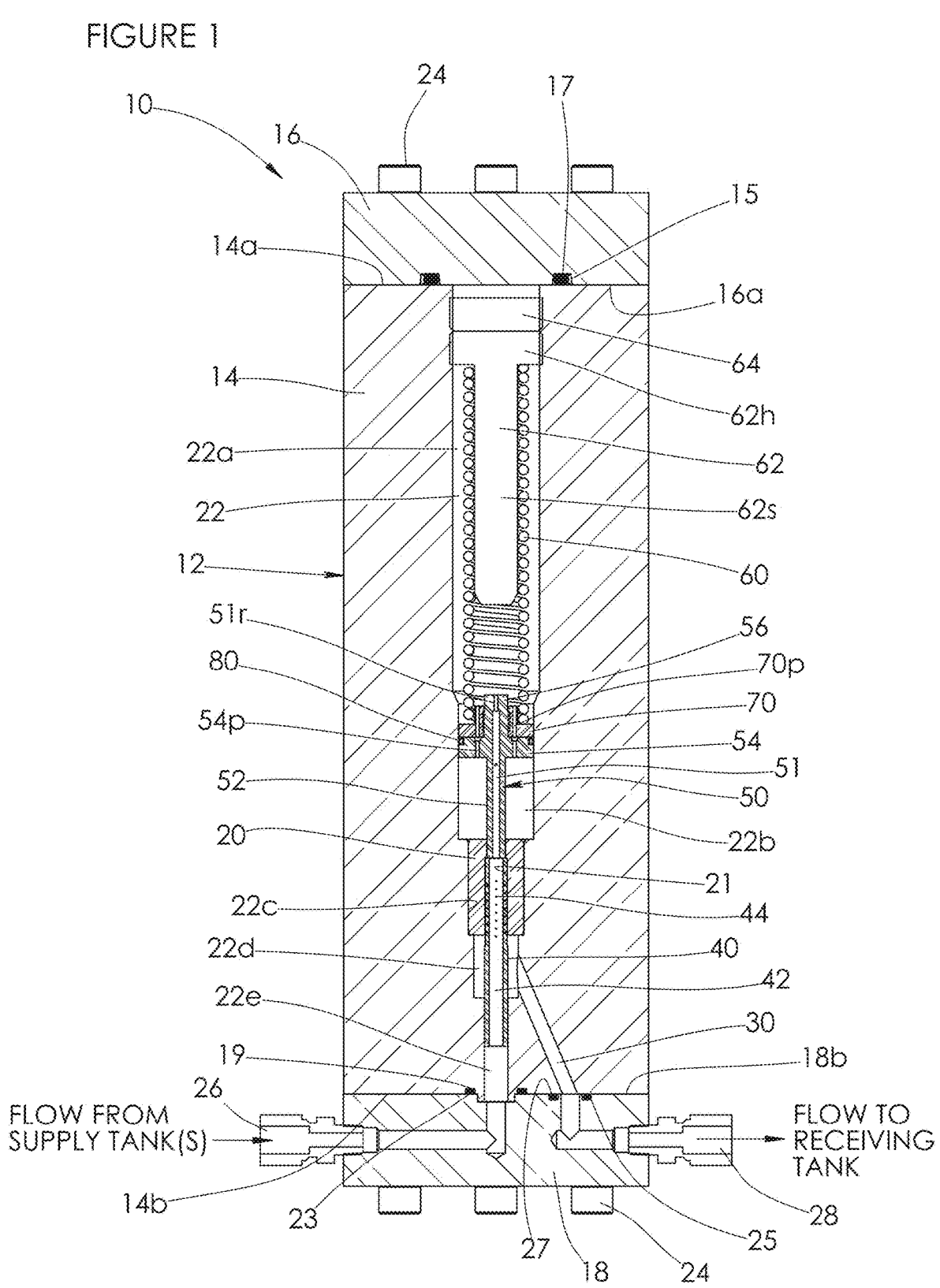
FIG. 1 is a longitudinal cross-sectional view of a passive modulating flow control valve according to an embodiment of the present invention, the valve shown in a closed position.

One embodiment of a passive, modulating flow control valve 10 according to the present invention is shown in FIG. 1. Although not limited to the following, the passive, modulating flow control valve 10 is designed to operate in hydrogen fueling stations that recharge hydrogen tanks installed in hydrogen powered cars and trucks.

Figure 2:
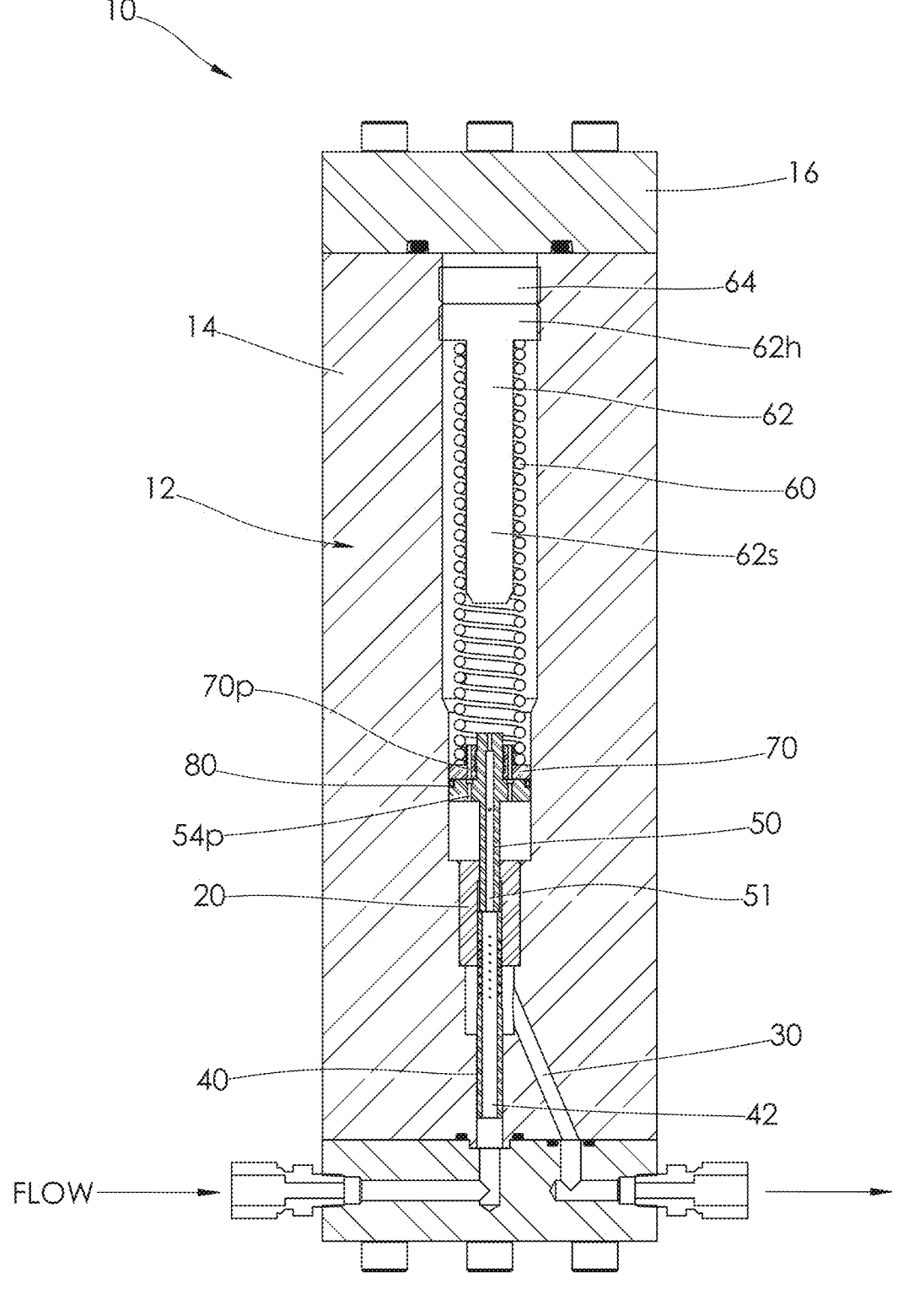
FIG. 2 is a longitudinal cross-sectional view of the passive modulating flow control valve shown in claim 1, the valve shown in a half-open position.
Figure 3:
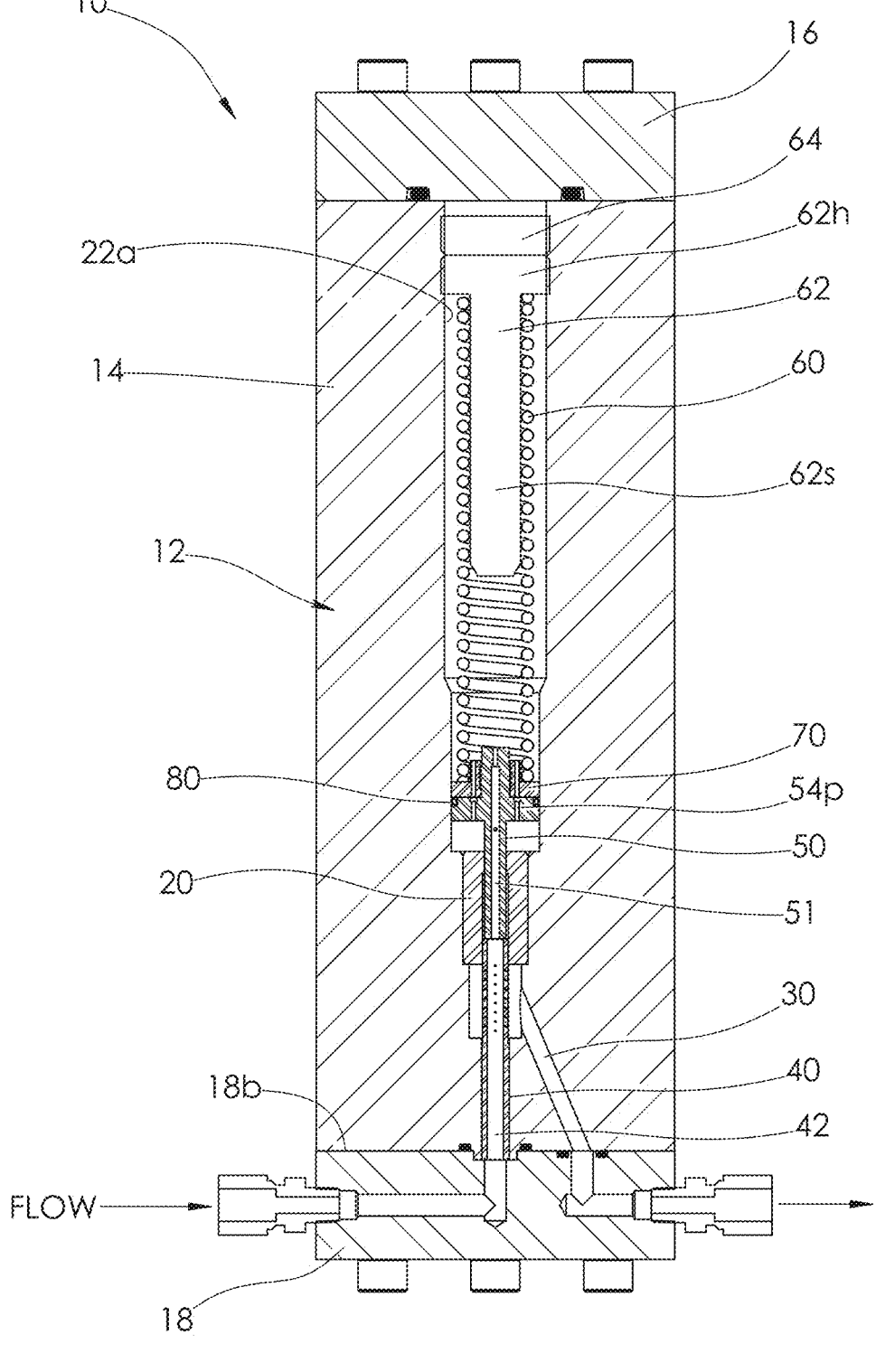
FIG. 3 is a longitudinal cross-sectional view of the passive modulating flow control valve shown in claim 1, the valve shown in a fully-open position.

With reference to FIGS. 1, 2 and 3, the primary components of the passive, modulating flow control valve 10 include a body assembly 12, poppet 40, push rod assembly 50, spring 60, spring seat 70, and damping component 80. The flow control valve 10 is shown in a "closed" position in FIG. 1, in a "half-open" position in FIG. 2, and in a "fully-open" position in FIG. 3.

The body assembly 12 shown in FIG. 1 includes a main body 14, upper body 16, lower body 18 and body insert guide or insert poppet guide 20. The upper and lower bodies 16, 18 are secured to the main body 14, preferably with fasteners 24. The main body 14 includes a longitudinal bore 22, preferably a stepped bore having a plurality of diameters. In one embodiment, the longitudinal bore 22 includes a first bore portion 22a housing a majority of the spring 60, a second bore portion 22b receiving at least a portion of the push rod assembly 50 and spring seat 70, a third bore portion 22c for receiving the insert poppet guide 20, a fourth bore portion 22d and a fifth bore portion 22e.

In the embodiment shown in FIG. 1, the lower body 18 includes an inlet passageway 26 in fluid communication with the fifth bore portion 22e of the main body 14. The lower body 18 also includes an outlet passageway 28 in fluid communication with an outlet passage 30 of the main body 14 in fluid communication with the fourth bore portion 22d of the main body longitudinal bore 22.

Referring to FIG. 3, the flow control valve 10 is shown in the fully-open position. The valve 10 is in the fully-open position when the differential pressure between the supply tank and receiving tank is at a minimum differential pressure. In this condition, a lower end of the poppet 40 preferably abuts the lower body 18 and limits further downward axial movement of the poppet 40. Preferably, a lower end of the push rod assembly 50 abuts the upper end of the poppet 40. The spring seat 70 is connected, preferably by threads, to the push rod assembly 50. The compression spring 60 is positioned between the spring seat 70 and a spring guide screw 62 preferably having a threaded head 62h and an elongated shaft 62s. Preferably, the upper end of the first bore portion 22a is threaded to threadedly engage the threaded head 62h of the spring guide screw 62. It is to be understood that the spring guide screw 62 is threaded to a position to provide the desired spring force on the spring seat 70, push rod assembly 50 and poppet 40. In a preferred embodiment an externally threaded backup nut 64 is threaded in the first bore portion 22a and abuts the spring screw guide 62 to maintain the axial position of the spring screw guide 62. The elongated shaft 62s of the spring guide screw 62 is positioned within the coiled spring 60 and helps to maintain the spring 60 in a substantially axial orientation.

Figure 1A:
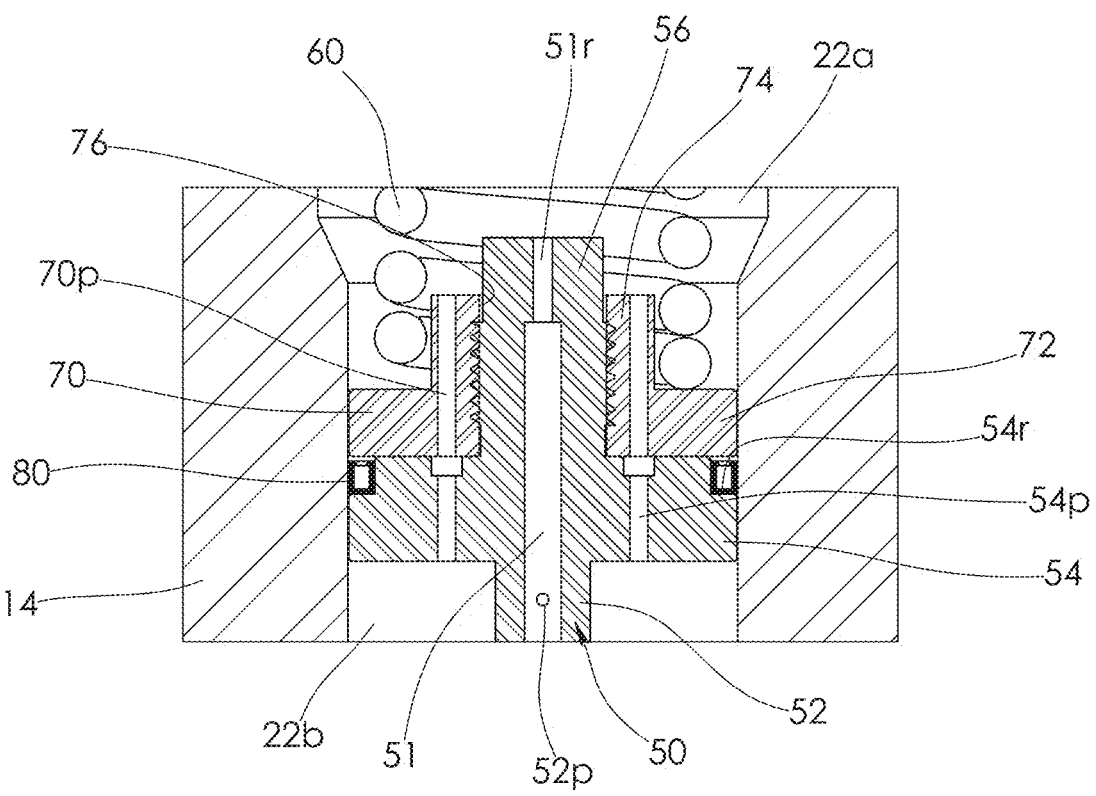
FIG. 1A is an enlarged fragmentary, longitudinal cross-sectional view of a spring seat and push rod portion of the flow control valve of FIG. 1.
Figure 4:
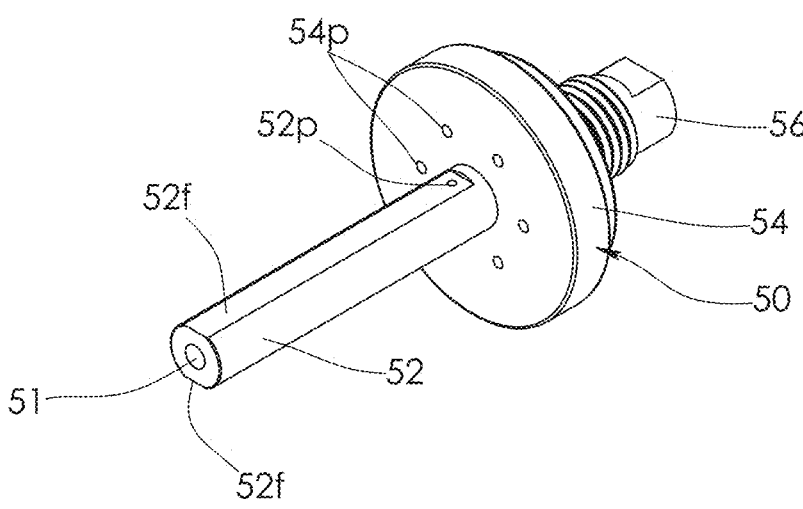
FIG. 4 is a perspective view of the push rod assembly.

Referring to FIGS. 1, 1A and 4, the push rod assembly 50 includes a downward extension member 52, preferably elongated, an enlarged medial flange 54 and an upwardly extending stem 56. A flow passageway 51 extends axially through the push rod assembly 50. Preferably, the flow passageway 51 has a reduced diameter 51r in the stem 56, as best shown in FIG. 1A.

As best shown in FIG. 4, the extension member 52, while generally circular, preferably includes one or more exterior flat surfaces 52f along a majority of the length of the extension member 52. Preferably, with reference to FIGS. 3A and 4, at least one radial flow passage 52p extends from the flow passageway 51 to the flat surface 52f. Preferably, the at least one radial flow passage 52p is located in the extension member 52 near the medial flange 54. With reference to FIGS. 1, 1A, 2, 3 and 4, the push rod assembly 50 includes one or more axial ports 54p extending through the medial flange 54.

The poppet 40, spring seat 70, push rod assembly 50, and spring 60 are a spring-mass system. As such, the system responds to changes in operating conditions and has the tendency to oscillate. If too little friction is present, the poppet 40 will be more prone to moderate to high frequency oscillations of substantial magnitude. Poppet oscillation affects the flow control capability and may result in accelerated wear and damage. If too much friction is present, the poppet 40 will not respond proportionately to differential pressure and the hysteresis between the actual position and ideal position will affect the flow control capabilities. Control of the friction is important as the valve mass-spring-damper system is an open control loop due to it being a passive device.

Figure 6:
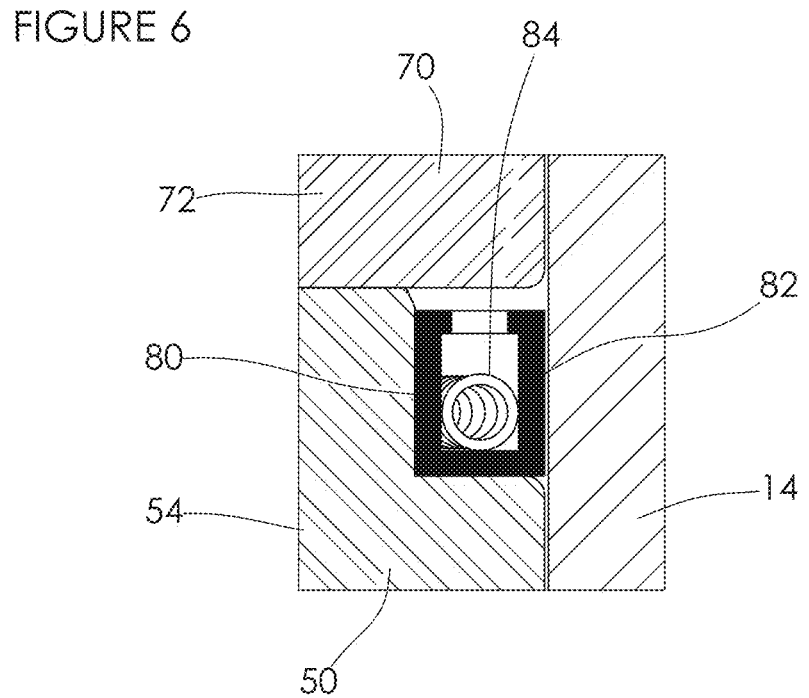
FIG. 6 is a cross-sectional view of a damping component.

As best shown in FIGS. 1A and 6, a damping component 80 may be installed in the flow control valve 10, preferably as part of the push rod assembly 50 or the spring seat 70. In FIG. 1A, an annular recess 54r formed in the medial flange 54 receives the damping component 80. The damping component 80 may comprise an annular component 82, preferably a durable and low wear material like plastic, housing a canted spring 84. The damping component 80 is a friction generating device that relies on compression of the plastic annular component 82 against the main body wall of the second bore portion 22b of the longitudinal bore 22. The canted spring 84 helps maintain the same level of compression as normal wear of the damping component 80 occurs.

Referring to FIG. 1A, the spring seat 70 includes a flange 72, a neck 74 having a central bore 76 therethrough, and a plurality of axial passages 70p. The plurality of axial passages 70p are arranged and designed to axially align with the axial ports 54p of the medial flange 54 of the push rod assembly 50 and permit fluid communication across the joined spring seat 70 and push rod assembly 50. An annular groove intersecting the plurality of axial ports 54p may be formed in the medial flange 54 to facilitate the fluid communication between the axial ports 54p and the axial passages 70p as shown in FIG. 1A. The spring seat 70 may be threadedly connected to the stem 56 of the push rod assembly 50. As shown in FIG. 1A, the spring seat flange 72 may help secure the damping component 80 in the recess 54r of the push rod assembly 50.

The spring seat 70 and the push rod assembly 50 are designed to align the spring 60, allow pressure to balance across the spring seat 70, and engage with the poppet 40 without transferring lateral load to the poppet 40. The push rod assembly 50 has an axial flow passage 51 that has a reduction in flow area 51r on the spring side. The reduction 51r serves to ensure that the pressure on the spring side remains less than the pressure on the poppet side of the spring seat 70 and push rod 50 during transient pressure. The momentary imbalance in pressure across the spring seat 70 and push rod 50 will help promote rapid poppet closure during transient increases in differential pressure.

Figure 3A:
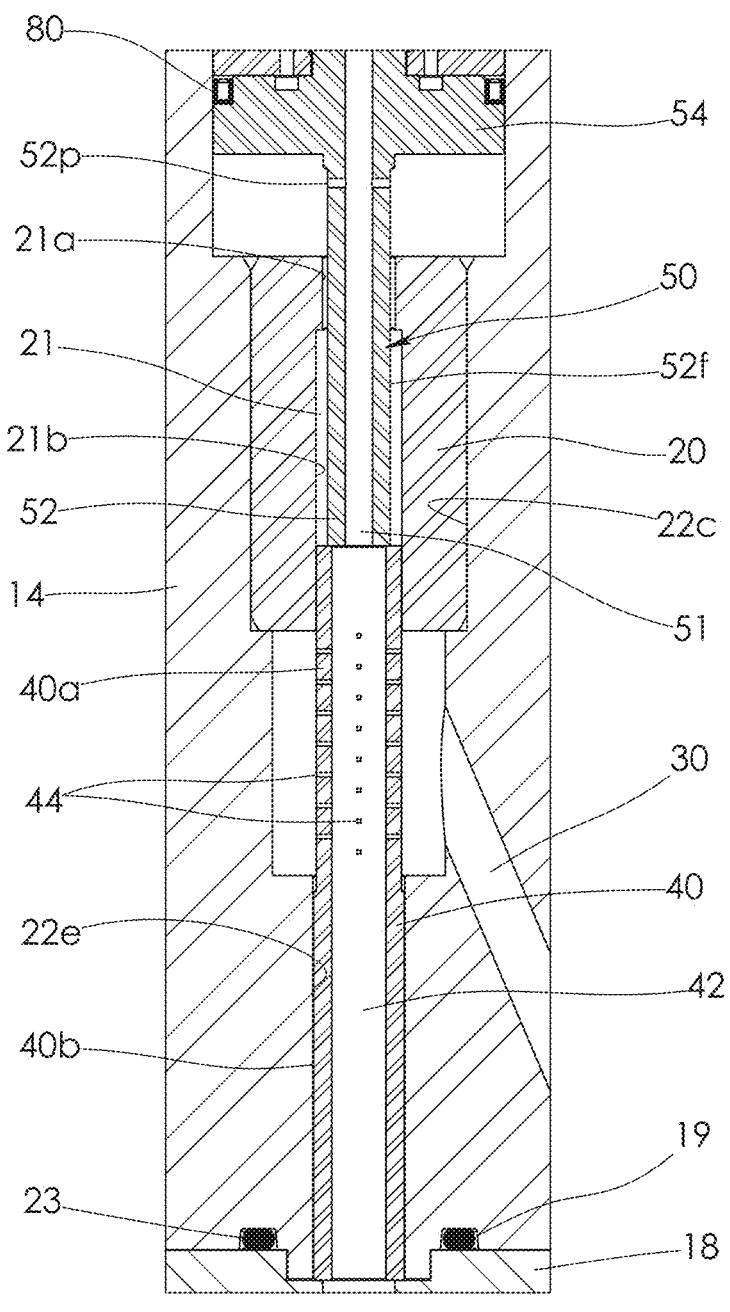
FIG. 3A is an enlarged fragmentary, longitudinal cross-sectional view of the poppet and push rod assembly of the flow control valve of FIG. 3, the view rotated 90° relative to the view of FIG. 3, the poppet in the fully-open position.

With reference to FIGS. 1 and 3A, the insert poppet guide 20 is securely received, preferably fixedly received in the third bore portion 22c of the main body longitudinal bore 22. The insert poppet guide 20 includes a longitudinal bore 21, preferably a stepped bore, as best seen in FIG. 3A. Referring to FIG. 3A, the longitudinal bore 21 includes an upper bore portion 21a and a lower bore portion 21b, with the lower bore portion 21b having a larger diameter than the upper bore portion 21a. The diameter of the lower bore portion 21b of the insert poppet guide 20 is preferably slightly smaller than the diameter of the fifth bore portion 22e of the longitudinal bore 22 of the main body 14 and axially aligned therewith. The main body 14 and insert poppet guide 20 provide well aligned guide surfaces for the poppet 40. The flow passages through the main body 14 are sized to ensure their inherent resistance does not affect the designed and/or intended trim (flow) characteristics of the poppet.

The body assembly 12 is a pressure boundary and designed for high pressure. With reference to FIG. 1, an annular seal groove 15 around the longitudinal bore 22 is formed in a lower surface 16a of the upper body 16 or an upper surface 14a of the main body 14. A seal ring 17 received in the seal groove 15 provides a seal between the upper and main bodies 16 and 14, respectively. An annular seal groove 19 around the fifth bore portion 22e of the longitudinal bore 22 is formed in an upper surface 18b of the lower body 18 or a lower surface 14b of the main body 14. A seal ring 23 received in the seal groove 19 provides a seal around the fifth bore portion 22e between the main and lower bodies 14 and 18, respectively. Similarly, an annular seal groove 25 around the outlet passage 30 is formed in an upper surface 18b of the lower body 18 or a lower surface 14b of the main body 14. A seal ring 27 received in the seal groove 25 provides a seal around the outlet passage 30 between the main and lower bodies 14 and 18, respectively.

Figure 5:
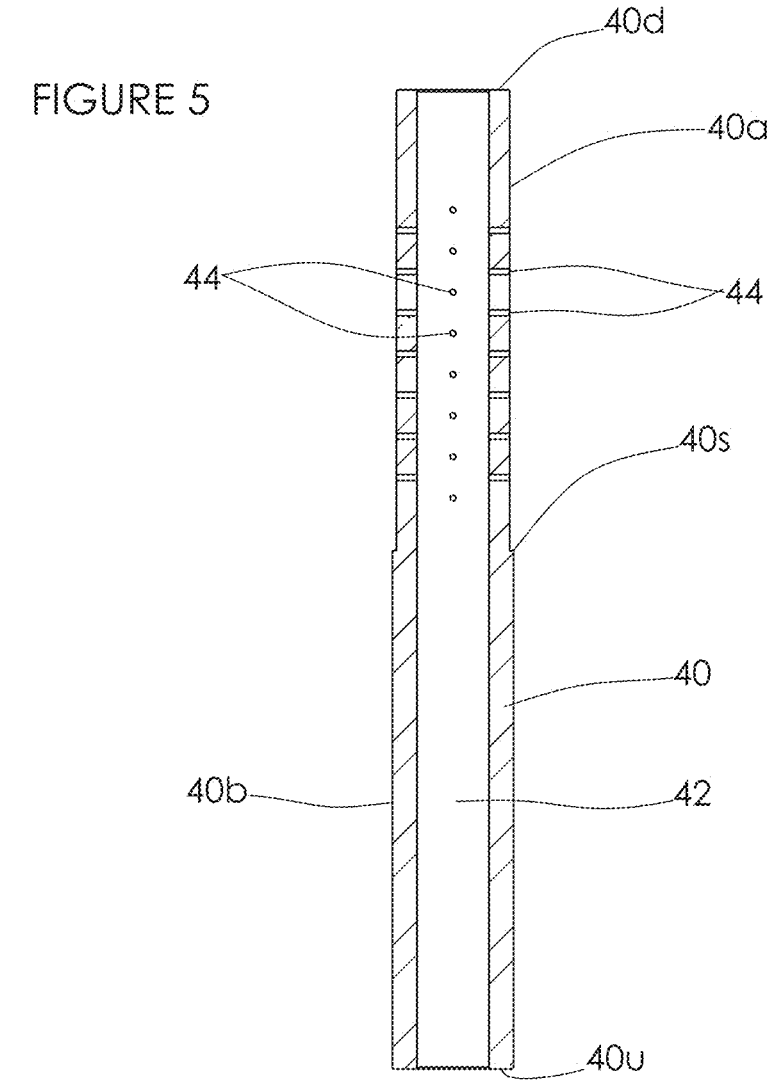
FIG. 5 is an enlarged cross-sectional view of the poppet.

An enlarged cross-section of the poppet 40 is shown in FIG. 5. The poppet 40 comprises a tubular member having an internal flow passage 42 therethrough, preferably having a uniform bore diameter extending from an upstream end 40u to a downstream end 40d of the poppet 40. The poppet 40 includes an array of radial flow passages 44 along an upper portion 40a of its length. Preferably, the radial flow passages 44 are sized and spaced to develop the required trim (flow) characteristics. As best shown in FIG. 5, the upper portion 40a of the poppet 40 preferably has a smaller outer diameter than a lower portion 40b of the poppet 40. The change in outer diameter preferably occurs at a step 40s just prior to the start of the radially aligned flow passages 44.

The poppet 40 is designed to directly respond to changes in differential pressure to control flow rate. In a preferred embodiment, the poppet 40 has a slightly unbalanced area. The unbalanced area is the area across which the differential pressure acts. The unbalanced area is achieved via the tight clearances between the poppet 40 and insert poppet guide 20, the internal flow passage 42 running along the long axis of the poppet 40, and the change in outer diameter at the step 40s that occurs just prior to the start of the radially aligned flow passages 44. The range of acceptable unbalanced areas is based on the required spring rate.

With reference to FIG. 5, during operation of the flow control valve 10, a closing force is applied to the poppet by the fluid differential pressure across the valve 10 acting on an axial area of the poppet 40 equivalent to the axially facing area defined by the step 40s in the outer diameter of the poppet 40. Explained another way and with reference to FIG. 5, it is to be understood that the combined axial areas of the step 40 and the downstream end 40d equal the axial area of the upstream end 40s. Additionally and with reference to FIGS. 2 and 5, the upstream and downstream ends 40u and 40d, respectively, are exposed to the high pressure of the supply fluid; however, the axial area of the step 40s is exposed to a lower fluid pressure in the fourth bore portion 22d in communication with the outlet passage 30. The net result is that the fluid differential pressure and the unbalanced area of the poppet 40 results in a closing force on the poppet 40. The greater the fluid differential pressure, the larger the closing force on the poppet 40. The closing force is countered by the force of the spring 60 acting against the spring seat 70, push rod assembly 50 abutting the downstream end 40d of the poppet 40. Conversely, as the fluid differential pressure decreases, the fluid force decreases and the spring force acts on the poppet 40 to move the poppet 40 downward and expose more radial holes 44 providing the means to maintain the mass flow rate into the fourth bore portion. Mass flow rate is proportional to $C_v*(DP*\rho)^{1/2}$ where $C_v$ is flow coefficient, DP is differential pressure and p is density. The relationship between valve Cv and position is established based on the number of radial holes exposed to the "low" pressure region of the body assembly 12.

Figure 1B:
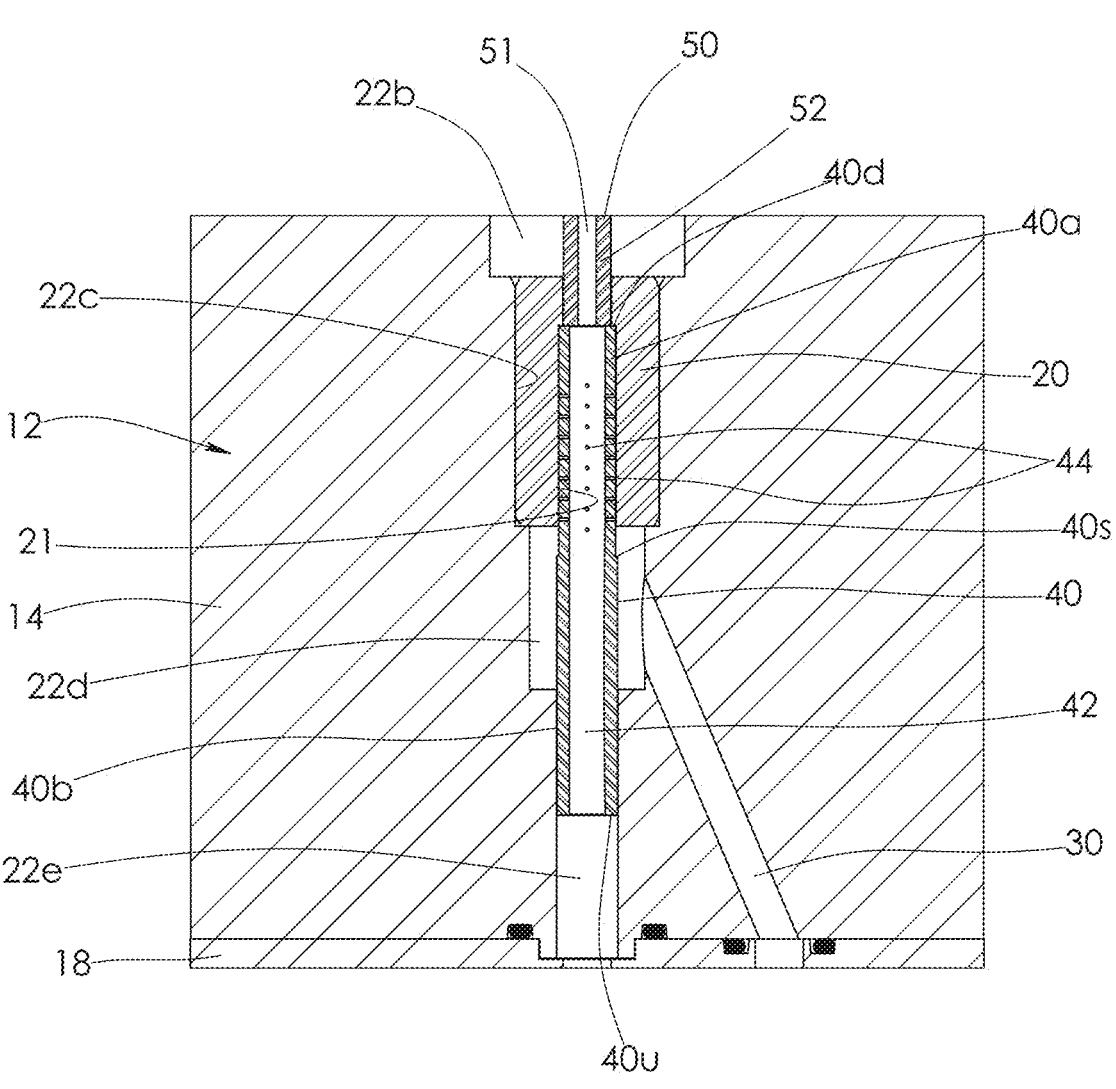
FIG. 1B is an enlarged fragmentary, longitudinal cross-sectional view of a poppet portion of the flow control valve of FIG. 1, the poppet in the closed position.

As discussed above, the poppet 40 is designed with the array of radial flow passages 44. As shown in FIGS. 1 and 1B, as the poppet 40 is pushed closed by the differential pressure, fewer holes 44 remain uncovered by the insert poppet guide 20, which increases the flow resistance. The tight clearance between the poppet 40 and the longitudinal bore 21 of the insert poppet guide 20 serves to help maintain the required flow characteristics. The poppet 40 is designed to have flow characteristics as this allows for a conventional coil spring 60 with constant spring rate. However, it is to be understood that the poppet 40 may have other characteristics as required by the system, as for example quick opening, linear, or equal percentage.

The primary flow path of the fluid medium is through the valve inlet 26 into the internal flow passage that runs along the longitudinal axis of the poppet 40, then out through the radial flow passages 44 and into the body cavity formed by the fourth bore portion 22d. The fluid medium in the body cavity 22d then flows through flow outlet passage 30 into the valve outlet flow passageway 28. The radially-oriented flow passages 44 are the dominant flow restriction in the flow control valve 10 and cause a differential pressure between the longitudinal bore 21 of the insert poppet guide 20 and the second bore portion 22b of the main body 14. The poppet 40, push rod assembly 50, spring seat 70, and valve body assembly 12 are designed such that in the absence of a significant pressure transient (e.g., caused by tank switching), the pressure is nearly equal throughout flow passages 22e, 42, 51, 22a, and 22b. The pressure in these regions acts on the upstream face at the lower end of the poppet 40 and on the downstream face at the upper end of the poppet 40. The pressure in the fourth bore portion 22d is much lower than in the fifth bore portion 22e and the second bore portion 22b. The pressure in the fourth bore portion 22d acts on the step feature 40s created at the change in outer diameter of the poppet 40. The difference between the pressure in the fifth bore portion 22e and the fourth bore portion 22d and the unbalanced area at the change in outer diameter of the poppet 40 act in the closing direction. The push rod assembly 50 and spring seat 70 are designed such that in the presence of significant pressure transient caused by tank switching, the pressure at the reduced diameter 51r of the push rod assembly 50 and the first bore portion 22a are lower than in the second bore portion 22b. The difference in pressure between these regions acts on the spring seat 70 to quickly close the poppet 40.

Unlike most control valves, the passive, modulating, flow control valve 10 maintains a non-zero flow coefficient when the poppet 40 is in the fully closed position. The flow passages and poppet-to-body clearances are set to define a flow coefficient $(C_v)$ curve that includes a minimum $C_v$ based on the target flow rate and maximum possible differential pressure and a maximum $C_v$ at the fully-open position that is based on the target flow rate and minimum possible differential pressure. The poppet 40 of the passive, modulating flow control valve 10 rapidly responds to changing differential pressure that acts across the valve 10 to maintain as constant of a mass flow rate as possible.

Aspects of the spring design are the preload, spring rate, allowable range of compression (i.e., poppet travel), and outer diameter of the coil. The spring preload is determined based on the specified minimum differential pressure at which poppet travel should occur. This is an outcome of the application of Newton's Second Law and resulting summation of forces. In order to maintain the target flow rate, the valve 10 should reach full open as the differential pressure across the valve 10 decreases to the minimum value based on tank switching logic. The spring preload is selected such that the poppet 40 will remain fully-open until a specified minimum differential pressure is reached. The unbalanced area and spring force allow the poppet 40 to reposition proportional to differential pressure throughout the design range of differential pressure.

The spring rate and poppet travel are determined as a set and account for the required balance between the pressure force and the fully compressed spring force at the closed position. The pressure force is based on the maximum possible differential pressure acting on the unbalanced area of the poppet. The fully compressed spring force includes the initial preload plus the additional compression due to poppet travel.

The modulating, passive flow control valve 10 includes a poppet 40 having a precisely designed and constant, imbalanced area. The spring rate is selected to achieve the desired poppet travel over the design range of differential pressure. The spring preload is selected such that the poppet will remain fully open until a specified minimum differential pressure is reached. The imbalanced area and spring force allow the poppet to reposition proportional to differential pressure throughout the design range of differential pressure. The array of radial holes 44 in the poppet 40 are used to define the trim characteristics. As the poppet 40 is pushed closed by the differential pressure, fewer holes remain uncovered, which increases the flow resistance. The valve 10 includes a single modulating poppet 40 with designed flow/trim characteristics that responds directly to differential pressure acting on it allowing it to achieve tight mass flow rate control.

NOMENCLATURE LIST passive modulating flow control valve 10
body assembly 12
main body 14
upper surface 14a
annular seal groove 15
upper body 16
lower surface 16a
seal ring 17
lower body 18
annular seal groove 19
insert poppet guide 20
longitudinal bore 21
upper bore portion 21a
lower bore portion 21b
longitudinal bore 22
first bore portion 22a
second bore portion 22b
third bore portion 22c
fourth bore portion 22d
fifth bore portion 22e
seal ring 23 fasteners 24
annular seal groove 25
inlet passageway 26
seal ring 27
outlet passageway 28
outlet passage 30
poppet 40
upper portion 40*a*
lower portion 40*b*
downstream end 40*d*
step 40*s*
upstream end 40*u*
internal flow passage 42
radial flow passages 44
push rod assembly 50
flow passageway 51
reduced diameter 51*r*
extension member 52
flat surface 52*f*
radial flow passage 52*p*
medial flange 54
axial ports 54*p*
annular recess 54*r*
stem 56
spring 60
spring guide screw 62
head 62*h*
elongated shaft 62*s*
backup nut 64
spring seat 70
axial passages 70*p*
damping component 80
annular component 82
canted spring 84

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A passive modulating flow control valve for maintaining a substantially constant mass flow rate over a fluid differential pressure design range across the valve, the valve comprising: a body assembly comprising a main body having a longitudinal bore, the body assembly having a flow inlet passageway in communication with the longitudinal bore and a flow outlet passageway in communication with the longitudinal bore; a poppet guide received within the longitudinal bore, the poppet guide having an axial guide bore; a poppet having an internal passage extending axially through the poppet, the poppet having an upstream portion and a downstream portion, the downstream portion having a plurality of radially-oriented flow passages, the poppet having a first outer diameter on the downstream portion and a second outer diameter on the upstream portion, the outer diameter of the upstream portion being larger than the outer diameter of the downstream portion, the transition from the downstream portion outer diameter to the upstream portion outer diameter occurring at a step, wherein at least a portion of the downstream portion of the poppet is received in the axial guide bore and allowed to move axially relative to the poppet guide; a spring received within the longitudinal bore, the spring providing a spring force on the poppet; wherein the valve is allowed to transition from a fully-open position to a closed position and positions in between based upon the fluid differential pressure acting on the poppet.

2. The passive modulating flow control valve of claim 1, wherein the plurality of radially-oriented flow passages includes radially-oriented flow passages spaced at different distances from a downstream end of the poppet.

3. The passive modulating flow control valve of claim 1, wherein in the fully closed position substantially all of the plurality of radially-oriented flow passages are within the poppet guide and covered.

4. The passive modulating flow control valve of claim 1, wherein the valve has a design range of differential pressure ranging between a high differential pressure and a low differential pressure, wherein at the high differential pressure the poppet is forced to the closed position and substantially all of the plurality of radially-oriented flow passages are within the poppet guide and covered, and wherein at the low differential pressure the poppet is forced to the open position and the plurality of radially-oriented flow passages are uncovered.

5. The passive modulating flow control valve of claim 4, wherein in the open position the plurality of radially-oriented flow passages are in fluid communication with the flow outlet passageway.

6. A passive modulating flow control valve comprising:
a body assembly comprising a main body having a longitudinal bore, the body assembly having a flow inlet passageway in communication with the longitudinal bore and a flow outlet passageway in communication with the longitudinal bore;
a poppet guide received within the longitudinal bore, the poppet guide having an axial guide bore;
a poppet having an internal passage extending axially through the poppet, the poppet having an upstream portion and a downstream portion, the downstream portion having a plurality of radially-oriented flow passages, the poppet having a first outer diameter on the downstream portion and a second outer diameter on the upstream portion, the outer diameter of the upstream portion being larger than the outer diameter of the downstream portion, the transition from the downstream portion outer diameter to the upstream portion outer diameter occurring at a step,
wherein at least a portion of the downstream portion of the poppet is received in the axial guide bore and allowed to move axially relative to the poppet guide;
a push rod assembly abutting the downstream portion of the poppet;
a spring seat connected to the push rod assembly;
a spring guide screw engaging the body assembly;
a spring received within the longitudinal bore, the spring having a first end contacting the spring guide screw and a second end contacting the spring seat, the spring providing a spring force on the poppet.

7. The passive modulating flow control valve of claim 6, wherein the push rod assembly includes a flow passageway extending therethrough, the flow passageway in fluid communication with the internal flow passage of the poppet.

8. The passive modulating flow control valve of claim 7, wherein the push rod assembly includes a medial flange in contact with the longitudinal bore of the body assembly, and the medial flange includes a plurality of axial ports extending therethrough.

9. The passive modulating flow control valve of claim 8, further comprising an annular damping component received in an annular recess of the medial flange, the damping component contacting the longitudinal bore of the body assembly.

10. The passive modulating flow control valve of claim 7, wherein the flow passageway of the push rod assembly includes a reduced diameter portion at an upper end of the push rod assembly.

11. The passive modulating flow control valve of claim 6, wherein the plurality of radially-oriented flow passages are specifically spaced along a length of the downstream portion of the poppet.

12. The passive modulating flow control valve of claim 6, wherein in the fully closed position substantially all of the plurality of radially-oriented flow passages are within the poppet guide and covered.

13. The passive modulating flow control valve of claim 6, wherein the valve has a design range of differential pressure ranging between a high differential pressure and a low differential pressure, wherein at the high differential pressure the poppet is forced to the closed position and substantially all of the plurality of radially-oriented flow passages are within the poppet guide and covered, and wherein at the low differential pressure the poppet is forced to the open position and the plurality of radially-oriented flow passages are uncovered.

14. The passive modulating flow control valve of claim 13, wherein in the open position the plurality of radially-oriented flow passages are in fluid communication with the flow outlet passageway.

15. A passive modulating flow control valve comprising:
a body assembly comprising a main body having a longitudinal bore, the body assembly having a flow inlet passageway in communication with the longitudinal bore and a flow outlet passageway in communication with the longitudinal bore;
a poppet guide received within the longitudinal bore, the poppet guide having an axial guide bore;
a poppet having an internal passage extending axially through the poppet, the poppet having an upstream portion and a downstream portion, the downstream portion having a plurality of radially-oriented flow passages, wherein the downstream portion of the poppet is received in the axial guide bore and allowed to move axially relative to the poppet guide;
a spring received within the longitudinal bore, the spring providing a spring force on the poppet;
wherein the valve is allowed to transition from a fully-open position to a closed position and positions in between based upon a fluid differential pressure acting on the poppet.

16. The passive modulating flow control valve of claim 15, wherein the poppet has a first outer diameter on the downstream portion and a second outer diameter on the upstream portion, the outer diameter of the upstream portion being larger than the outer diameter of the downstream portion.

17. The passive modulating flow control valve of claim 15, wherein the plurality of radially-oriented flow passages includes radially-oriented flow passages spaced at different distances from a downstream end of the poppet.

18. The passive modulating flow control valve of claim 15, wherein the valve has a design range of differential pressure ranging between a high differential pressure and a low differential pressure, wherein at the high differential pressure the poppet is forced to the closed position and substantially all of the plurality of radially-oriented flow passages are within the poppet guide and covered, and wherein at the low differential pressure the poppet is forced to the open position and the plurality of radially-oriented flow passages are uncovered.

19. The passive modulating flow control valve of claim 15, further comprising:
a push rod assembly abutting the downstream portion of the poppet;
a spring seat connected to the push rod assembly;
a spring guide screw engaging the body assembly,
wherein the spring has a first end contacting the spring guide screw and a second end contacting the spring seat.

20. The passive modulating flow control valve of claim 19, wherein the push rod assembly includes a flow passageway extending therethrough, the flow passageway in fluid communication with the internal flow passage of the poppet.

21. The passive modulating flow control valve of claim 20, wherein the push rod assembly includes a medial flange in contact with the longitudinal bore of the body assembly, and the medial flange includes a plurality of axial ports extending therethrough.

22. The passive modulating flow control valve of claim 21, further comprising an annular damping component received in an annular recess of the medial flange, the damping component contacting the longitudinal bore of the body assembly.

23. The passive modulating flow control valve of claim 20, wherein the flow passageway of the push rod assembly includes a reduced diameter portion at an upper end of the push rod assembly.

* * * * *